US011761405B2

(12) United States Patent
Collet

(10) Patent No.: US 11,761,405 B2
(45) Date of Patent: Sep. 19, 2023

(54) FUEL VAPOR EMISSION CONTROL DEVICE WITH LEAK NEUTRALISATION

(71) Applicant: VITESCO TECHNOLOGIES GMBH, Hanover (DE)

(72) Inventor: Thierry Collet, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 65 days.

(21) Appl. No.: 17/610,235

(22) PCT Filed: May 13, 2020

(86) PCT No.: PCT/EP2020/063272
§ 371 (c)(1),
(2) Date: Nov. 10, 2021

(87) PCT Pub. No.: WO2020/229512
PCT Pub. Date: Nov. 19, 2020

(65) Prior Publication Data
US 2022/0243687 A1 Aug. 4, 2022

(30) Foreign Application Priority Data

May 13, 2019 (FR) ..................................... 1904944

(51) Int. Cl.
*F02M 25/08* (2006.01)
*B01D 53/04* (2006.01)
*F02D 41/00* (2006.01)

(52) U.S. Cl.
CPC ..... *F02M 25/0809* (2013.01); *B01D 53/0407* (2013.01); *F02D 41/003* (2013.01);
(Continued)

(58) Field of Classification Search
CPC ........... F02M 25/0809; F02M 25/0836; B01D 53/0407; B01D 2253/102; B01D 2259/4566; F02D 41/003
(Continued)

(56) References Cited

U.S. PATENT DOCUMENTS

| 5,560,243 A | 10/1996 | Wild |
| 2016/0369714 A1 | 12/2016 | Burleigh et al. |

(Continued)

FOREIGN PATENT DOCUMENTS

| DE | 43 41 777 | 6/1995 |
| DE | 10 2009 009 897 | 8/2010 |

(Continued)

OTHER PUBLICATIONS

International Search Report for PCT/EP2020/063272 dated Jun. 8, 2020, 5 pages.
(Continued)

*Primary Examiner* — Mahmoud Gimie
(74) *Attorney, Agent, or Firm* — NIXON & VANDERHYE

(57) ABSTRACT

A fuel vapor emissions control device includes: —an absorbent filter; —a purge circuit including: a pump equipped with an intake and with a delivery outlet; an upstream duct; and a downstream duct. The pump includes an intake chamber into which the intake opens. The upstream duct is connected by one of its ends to the absorbent filter and via the other of its ends opens into the intake chamber. The downstream duct includes a double tubular wall defining two separate conduits.

20 Claims, 4 Drawing Sheets

(52) U.S. Cl.
CPC ... *F02M 25/0836* (2013.01); *B01D 2253/102* (2013.01); *B01D 2259/4516* (2013.01); *B01D 2259/4566* (2013.01)

(58) Field of Classification Search
USPC .......................................................... 123/518
See application file for complete search history.

(56) References Cited

U.S. PATENT DOCUMENTS

| | | |
|---|---|---|
| 2017/0226939 A1 | 8/2017 | Akito |
| 2019/0063375 A1 | 2/2019 | Dyer |
| 2019/0093607 A1 | 3/2019 | Dudar |

FOREIGN PATENT DOCUMENTS

| | | | |
|---|---|---|---|
| DE | 10 2016 217 444 | | 3/2018 |
| DE | 10 2017 008 716 | | 3/2019 |
| JP | 2019206924 A | * | 12/2019 |

OTHER PUBLICATIONS

Written Opinion of the ISA for PCT/EP2020/063272 dated Jun. 8, 2020, 5 pages.

* cited by examiner

FUEL VAPOR EMISSION CONTROL DEVICE WITH LEAK NEUTRALISATION

CROSS-REFERENCE TO THE RELATED APPLICATIONS

This application is the U.S. national phase of International Application No. PCT/EP2020/063272 filed May 13, 2020 which designated the U.S. and claims priority to FR Patent Application No. 1904944 filed May 13, 2019, the entire contents of each of which are hereby incorporated by reference.

BACKGROUND OF THE INVENTION

Field of the Invention

The invention relates to the field of internal combustion engines and, more particularly, the fuel supply of internal combustion engines. The invention is aimed at a fuel vapor emissions control device intended for a vehicle equipped with an internal combustion engine supplied from a fuel tank.

Description of the Related Art

Motor vehicles, in particular, supply their internal combustion engine from a fuel tank which is at risk of experiencing an increase in pressure, for example when there is an increase in ambient temperature. The fuel stored in the tank then in fact emits fuel vapors which need therefore to be removed from the tank.

For environmental and legislative reasons, and reasons of energy efficiency, the majority of the vehicles currently in production comprise a fuel vapor emissions control device able to absorb the fuel vapors coming from the tank and to periodically inject them into the engine to contribute to the supply thereof. The discharging of fuel vapors into the atmosphere is thus avoided, these vapors being profitably used for the propulsion of the vehicle.

These control devices convey fuel vapors and are generally associated with means for carrying out functional checks in order to detect potential leaks.

Certain technological trends, notably in the automotive field, such as the more widespread adoption of hybrid vehicles and vehicles equipped with automatic "stop and start" systems have an impact on these fuel vapor emissions control devices. Specifically, in such vehicles, the phases during which the engine is running have a tendency to become reduced in favor of stopping the engine or operating on electrical power, and the fuel vapor emissions control devices need to be able to inject fuel vapors during any phase in which the engine is running. In addition, as engine architectures become increasingly complex, it is necessary to be able to inject the fuel vapors at chosen intake points, without being dependent on the pressure at this intake point. That being the case, fuel vapor emissions control devices have evolved from passive systems in which the fuel vapors are drawn in by the engine, toward active systems equipped with a pump capable of injecting these fuel vapor emissions whatever the engine intake point and whatever the moment of operation of the engine.

These active fuel vapor emissions control devices equipped with a pump are particularly safety-critical.

Numerous means for detecting fuel vapor leaks in a control device are currently known and implemented, particularly in the automotive field.

For example, documents US2019063375 and US2019093607 describe fuel vapor emissions control devices that employ various sensors able directly or indirectly to detect leaks from the device, or else to detect abnormal device behavior indicative of a leak. Appropriate means for managing the leak are then implemented, such as closing a valve that stops the leak.

These leak detection means of the devices of the prior art are generally satisfactory in terms of their ability to detect and remedy fuel vapor leaks. However, in the particularly critical case of active fuel vapor emissions control devices equipped with a pump, these means prove insufficient in terms of the level of safety they afford.

SUMMARY OF THE INVENTION

It is an object of the invention to improve active fuel vapor emissions control devices equipped with a pump in terms of how they manage leaks that might arise in the fuel vapor circuit.

To this end, the invention relates to a fuel vapor emissions control device intended for a vehicle with an internal combustion engine supplied from a fuel tank, this device comprising:
  an absorbent filter designed to store fuel vapors coming from the fuel tank of the vehicle;
  a purge circuit for purging the absorbent filter and designed to inject the fuel vapors contained in the absorbent filter into the intake side of the engine of the vehicle, this purge circuit comprising: a pump equipped with an intake for drawing in the fuel vapors coming from the absorbent filter, and with a delivery outlet for delivering the fuel vapors to the engine; an upstream duct connecting the absorbent filter to the pump; a downstream duct connecting the pump to a fluidic connection for connection to the engine.

In this device:
  the pump comprises an intake chamber into which the intake of the pump opens;
  the upstream duct is connected by one of its ends to the absorbent filter and via the other of its ends opens into the intake chamber of the pump;
  the downstream duct comprises a double tubular wall defining two separate conduits: a first conduit connecting the delivery outlet of the pump to the fluidic connection for connection to the engine; and a second conduit which is connected by one of its ends to the fluidic connection for connection to the engine and which at the other of its ends opens into the intake chamber of the pump.

The invention guarantees maximum safety in the management of leaks from the device because it allows the leaks to be neutralized in a way that does not rely on any means of detecting or of stopping a leak.

The leaks considered here are the most critical leaks that occur downstream of the pump. If such a leak of fuel vapors occurs downstream of the pump, there is a risk that the entire contents of the absorbent filter will be expelled continuously, at a flow rate corresponding to the delivery flow rate of the pump. Such a leak would lead to a spread of these fuel vapor emissions near the engine and, in the most critical case, near exhaust zones or other parts at high temperature, which would constitute a fire risk.

According to the invention, such a level of criticality in respect of leaks situated downstream of the pump is reduced by the fact that the neutralization of the leak relies on means that are more reliable than means for detecting and stopping the flow of fuel vapors, which latter means may themselves be defective. The leak is neutralized directly through a structural arrangement of the elements of the control device.

The fuel vapor emissions control device according to the invention may implement complementary means for detecting and stopping the leak. However, any leak downstream of the pump is neutralized without any positive action from such complementary means. In the event of a leak downstream of the pump, the second conduit is automatically placed in communication with atmospheric pressure, which implies that the intake chamber of the pump itself is placed in communication with atmospheric pressure. Because the pump intake opens into this intake chamber, the pump intake will therefore from that moment draw in only atmospheric air, and therefore deliver only this atmospheric air. Thus, even if the device remains in operation in this leakage mode, the leak downstream of the pump becomes a leak of atmospheric air that has no critical consequence.

The operational reliability of the control device according to the invention is dependent upon structural mechanical means rather than on added elements such as sensors or other electronic or electromechanical elements.

The control device according to the invention provides control over leaks over the entirety of the downstream duct, from the pump as far as the fluidic connection to the engine.

The fuel vapor emissions control device may comprise the following additional features, alone or in combination:
- the fluidic connection forms a stopper for the second conduit;
- the fluidic connection for connection to the engine comprises a coupling connected to the first conduit and designed to inject fuel vapors into the intake side of the engine, and a stop surface adjacent to the coupling and designed to stopper the second conduit;
- the downstream duct comprises two coaxial tubular walls, the first conduit and the second conduit thus being coaxial;
- the first conduit is an internal conduit and the second conduit is an external conduit surrounding the first conduit;
- the device comprises a purge valve arranged on the purge circuit;
- the purge valve is arranged on the downstream duct of the purge circuit providing fluidic continuity with the second conduit;
- the device comprises additional leak-detection means;
- the pump is a motorized pump;
- the intake chamber consists of an enclosure surrounding the intake of the pump;
- the second conduit is connected to the intake chamber by an internal duct in the body of the pump;
- the downstream duct is connected to the pump by a connection comprising a first coupling connecting the first conduit to the delivery outlet of the pump, and a second coupling connecting the second conduit to the internal duct of the body of the pump;
- the pump is a venturi-effect pump, the intake of the pump consisting of a diffusion orifice made in a venturi tube;
- the intake chamber consists of an enclosure surrounding the venturi tube.

BRIEF DESCRIPTION OF THE DRAWINGS

Further features and advantages of the invention will become apparent from the description that is given hereinafter by way of non-limiting example, with reference to the accompanying drawings, in which.

DESCRIPTION OF THE PREFERRED EMBODIMENTS

Figure 1:
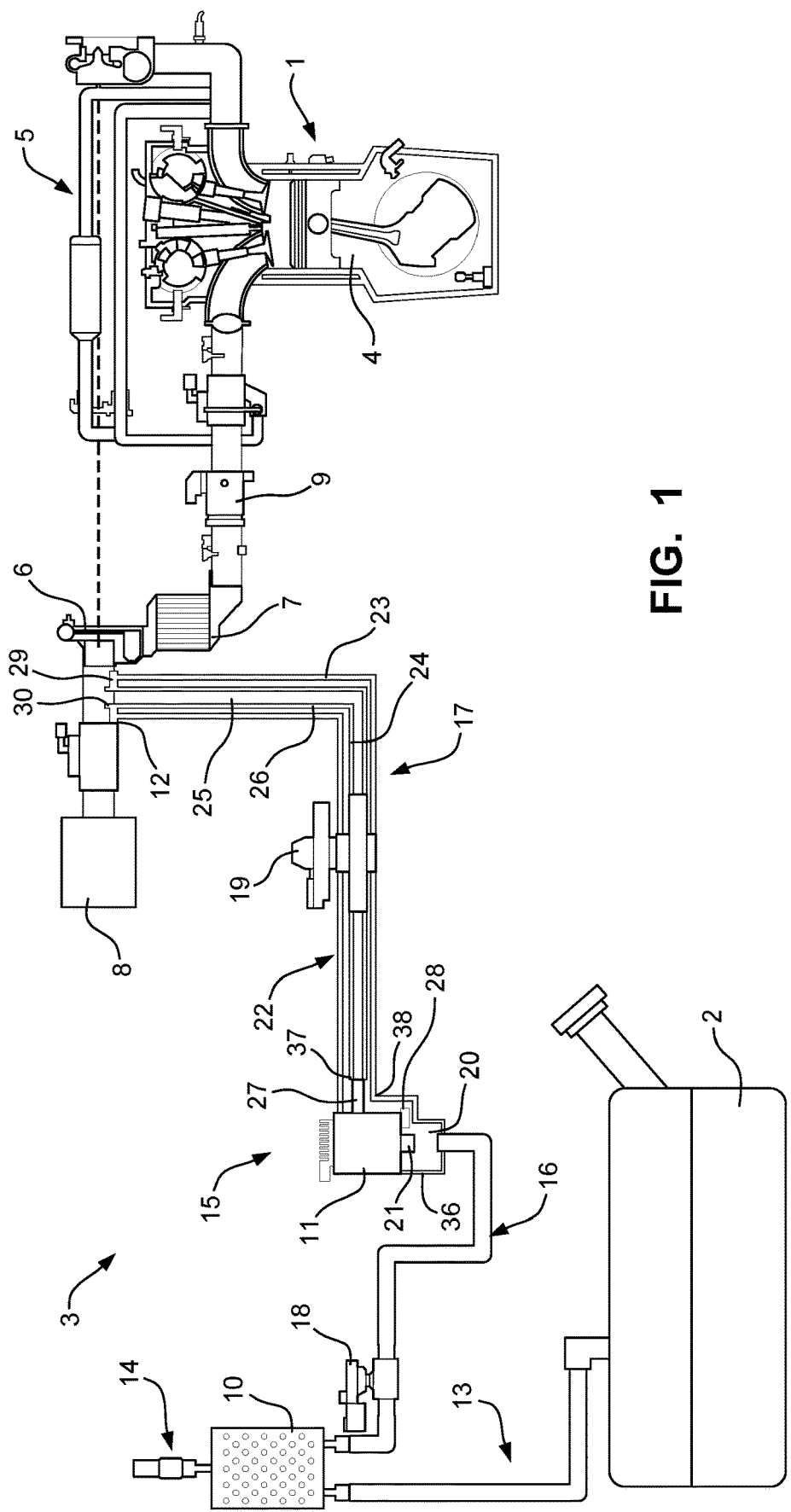
FIG. 1 is a schematic depiction of an assembly made up of an internal combustion engine, of a fuel tank, and of a device according to a first embodiment of the invention.
Figure 2:
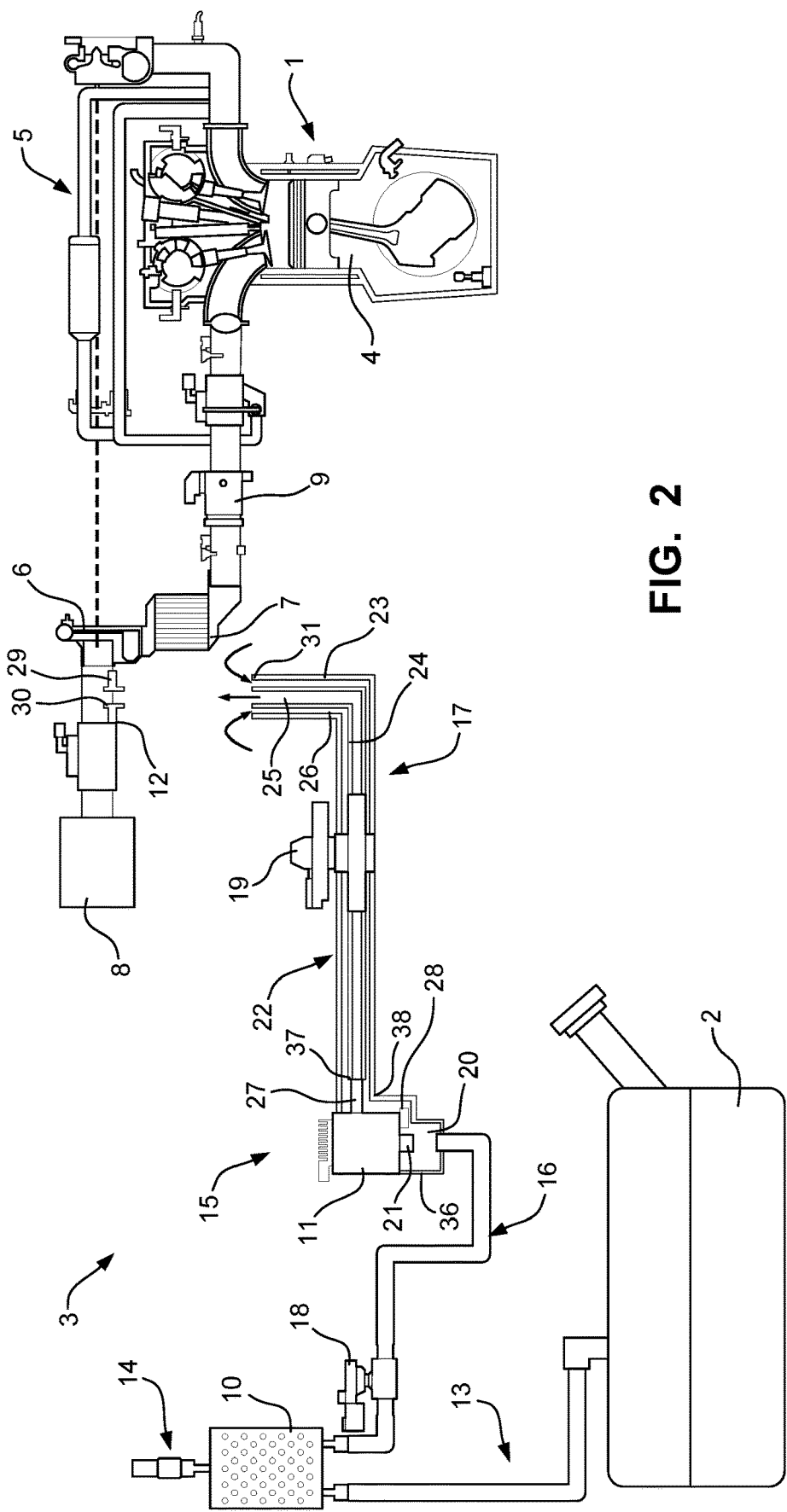
FIG. 2 depicts the assembly of FIG. 1 when a fuel vapor leak arises.

FIGS. 1 and 2 illustrate a first embodiment of the invention. These schematic figures depict an internal combustion engine 1, a fuel tank 2 intended to supply the engine 1 with fuel, and a fuel vapor emissions control device 3.

The engine 1 is schematically represented here as a cylinder piston assembly 4 viewed in cross section, and an assembly 5 associated with the cylinder head of the engine and comprising elements such as valves, injectors, spark plugs, exhaust gas recirculation system, etc. These known elements will not be described in further detail here.

In the present example, the engine 1 comprises an intake circuit equipped in the conventional way with an air filter 8, a turbocharger 6 that compresses the intake gases through an exchanger 7, and a throttle butterfly valve 9.

The tank 2 supplies a fuel-injection circuit supplying fuel to the injectors of the engine 1 (this fuel injection circuit has not been depicted).

A fuel vapor emissions control device, the device 3, allows fuel vapor emissions that are created inside the tank 2 to be removed from the tank 2 and to be periodically injected into the engine 1. This device 3 comprises an absorbent filter 10 (which is generally known as a canister), a pump 11 and a fluidic connection 12 for connection to the engine.

The absorbent filter 10 is connected to the tank 2 by an absorption circuit 13 that carries the fuel vapors from the tank 2 as far as the absorbent filter 10. The absorbent filter 10 is of conventional design, generally employing an active carbon filter.

The absorbent filter 10 is additionally connected to a breather circuit 14 allowing connection with the external surroundings.

The pump 11 in this instance is a motorized pump, for example an electric pump.

The absorbent filter 10 is additionally connected to the engine 1 by a purge circuit 15 comprising:
- an upstream duct 16 connecting the absorbent filter 10 to the inlet of the pump 11;
- a downstream duct 17 connecting the outlet of the pump 11 to the engine 1 via the connection 12.

In the present example, the fluidic connection 12 for connecting to the engine 1 is positioned upstream of the turbocharger 6. As an alternative, the connection 12 may be positioned at any other suitable point on the intake side of the engine 1, thanks to the freedom offered by the fact that the pump 11 injects the fuel vapors into the chosen connection point 12 at a suitable pressure.

Furthermore, the purge circuit comprises a pressure sensor 18 and a purge valve 19 which are arranged respectively on the upstream duct 16 and on the downstream duct 17.

This configuration allows fuel vapors from the tank 2 to be captured and stored in the absorbent filter 10. Intermittently, notably when the absorbent filter 10 is full, the purge valve 19 is commanded to open and the pump 11 is actuated to draw in the vapors from the absorbent filter 10 and deliver them to the intake side of the engine, via the connection 12.

The device 3 here comprises a means for neutralizing leaks from the downstream duct 17, which is to say leaks of maximum criticality. The pump 11 at its inlet comprises an intake chamber 20 delimited by an enclosure 36. The intake 21 of the pump 11 opens into the intake chamber 20. In addition, the downstream duct 17 comprises a double-walled tubular pipe 22 defining two separate conduits 23, 24. In the present example, the double pipe 22 comprises two coaxial walls: an external wall 23 and an internal wall 24. These two walls 23, 24 thus define a first conduit 25, which here is referred to as the central conduit 25, and a second conduit 26 which here is referred to as the external conduit 26.

The internal conduit 25 connects the delivery outlet 27 of the pump 11 to the intake side of the engine 1, via the fluidic connection 12. The external conduit 26 opens, via one of its ends, into the intake chamber 20 of the pump 11 and at the other of its ends is connected to the fluidic connection 12, in a fluidtight manner, which means to say that the fluidic connection 12 forms a stopper for the end of the external conduit 26.

The coaxial arrangement of the conduits 25, 26 offers the advantage of affording protection to the internal conduit 25.

The external conduit 26 thus constitutes a barrier preventing physical damage to the internal wall 24 delimiting the internal conduit 25. In the event of a break in this protective wall, the control device 3 switches to leak-neutralization mode.

The connection between the end of the external conduit 26 and the intake chamber 20 is made here by means of an internal duct 28 made in the body of the pump 11. Alternatively, the pipe 22 may be connected to the pump 11 in such a way that the end of the external conduit 26 is plugged and that the connection between the external conduit 26 and the intake chamber 20 is made by an attached tube opening at one end into the external conduit 26 and at the other end into the intake chamber 20.

The fluidic connection 12 for connection to the engine comprises a coupling 30 connected to the first conduit and designed to inject fuel vapors into the intake side of the engine 1, and a stop surface 29 adjacent to the coupling 30 and designed to stopper the external conduit 26. In the present example, the fluidic connection 12 comprises:

- a central coupling 30 for connecting the internal conduit 25 to the intake side of the engine 1;
- a flange 29 surrounding the coupling 30 and allowing the end of the external conduit 26 to be hermetically enclosed.

When the double pipe 22 is in place, the intake chamber 20 and the external conduit 26 are in communication and form one and the same space in which the same pressure prevails.

In the present example, the purge valve 19 is positioned on the downstream duct 17 and is therefore mounted in such a way as to ensure fluidic continuity within the external conduit 26.

During an operation of purging the absorbent filter 10, the purge valve 19 is opened and the pump 11 is actuated. The pump 11 draws in the fluid that is at its intake 21, namely the fluid that is present in the intake chamber 20. This fluid is delivered by the delivery outlet 27 of the pump 11 into the internal conduit 25 and therefore to the intake side of the engine.

The intake 21 of the pump 11 therefore creates a depression in the intake chamber 20. This depression is transmitted to the external conduit 26 which is fluidically connected to the intake chamber 20 and which is hermetically sealed at its end at the fluidic connection 12. Because the upstream duct 16 opens into the intake chamber 20, the depression created in the intake chamber 20 allows the fuel vapors emanating from the absorbent filter 10 to be drawn in. These fuel vapors enter the intake 21 of the pump 11 and are then delivered by the delivery outlet 27 to the internal conduit 25, the central coupling 30 of the fluidic connection 12, and the engine 1.

FIG. 1 thus illustrates the nominal mode of operation of the device 3. FIG. 2, for its part, illustrates the same elements as FIG. 1 when a leak occurs in the downstream duct 17 of the purge circuit 15. This leak is schematically indicated in FIG. 2 by the double pipe 22 having been depicted as being separated from the engine 1. Such a leak corresponds for example to the double pipe 22 having been pulled out, or to a break in this double pipe 22. In such a case, the internal conduit 25 and the external conduit 26 are now in communication with the atmosphere, at the broken end 31.

Because the control device 3 is an active device equipped with a pump 11, as long as the pump 11 is not activated, no fuel vapors are expelled.

When a purge operation takes place during or after the appearance of the leak, activation of the pump 11 creates a depression in the intake chamber 20, which this time is connected to the atmosphere via the external conduit 26. The permeability of the external conduit 26 is far greater than the permeability of the upstream duct 16, given the presence of the absorbent filter 10 and the pressure drops that the latter induces. The depression in the intake chamber 20 therefore causes air from the atmosphere to be drawn in via the external conduit 26. The fuel vapors contained in the absorbent filter 10 are therefore not drawn into the intake chamber 20. As a result, the intake 21 of the pump 11 is now supplied only with atmospheric air. This air is then delivered into the internal conduit 25 and therefore re-emerges via the broken end 31. The fuel vapors contained in the absorbent filter 10 are therefore not drawn into the intake chamber and are not spread following the leak. The pump 11 is reduced to operating in a closed loop with atmospheric air at the inlet and at the outlet.

Although the control device 3 is dysfunctional, the leak is nevertheless neutralized because it is unable to cause damage. The appearance of the leak itself generates the conditions for its own neutralization through the simultaneous connecting of the conduits 25, 26 to the atmosphere, without relying on any other detection or stopping element.

To complement the neutralizing of the leak, the control device 3 comprises conventional additional means for detecting this leak, for example thanks to monitoring by the pressure sensor 18, for stopping the pump 11 and for emitting a warning to the driver of the vehicle. Although the addition of these means for detecting and acting upon the leak is advantageous, the leak is nevertheless neutralized independently of these detection and action means.

Figure 3:
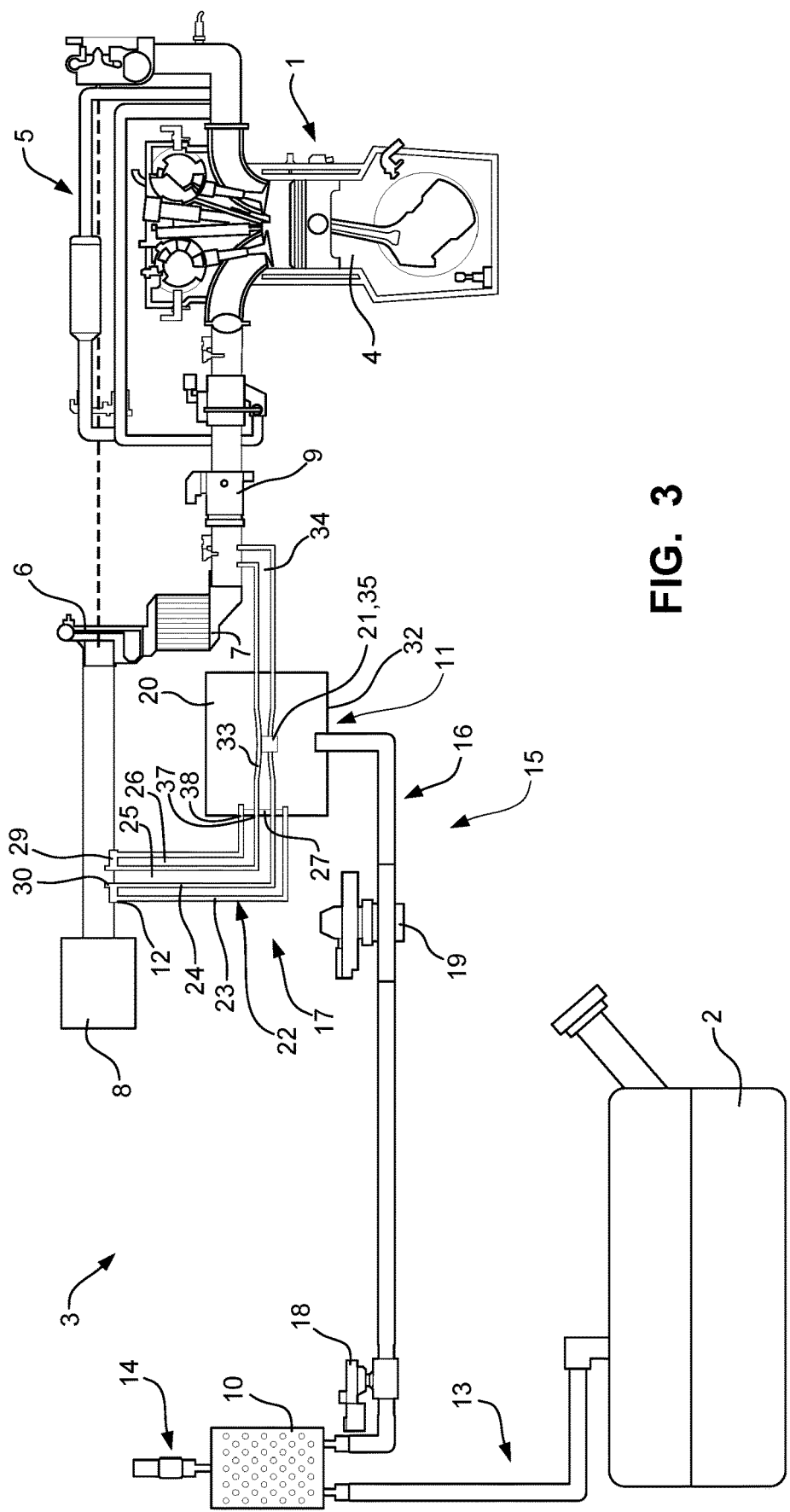
FIG. 3 is a schematic depiction of an assembly made up of an internal combustion engine, of a fuel tank, and of a device according to a second embodiment of the invention.
Figure 4:
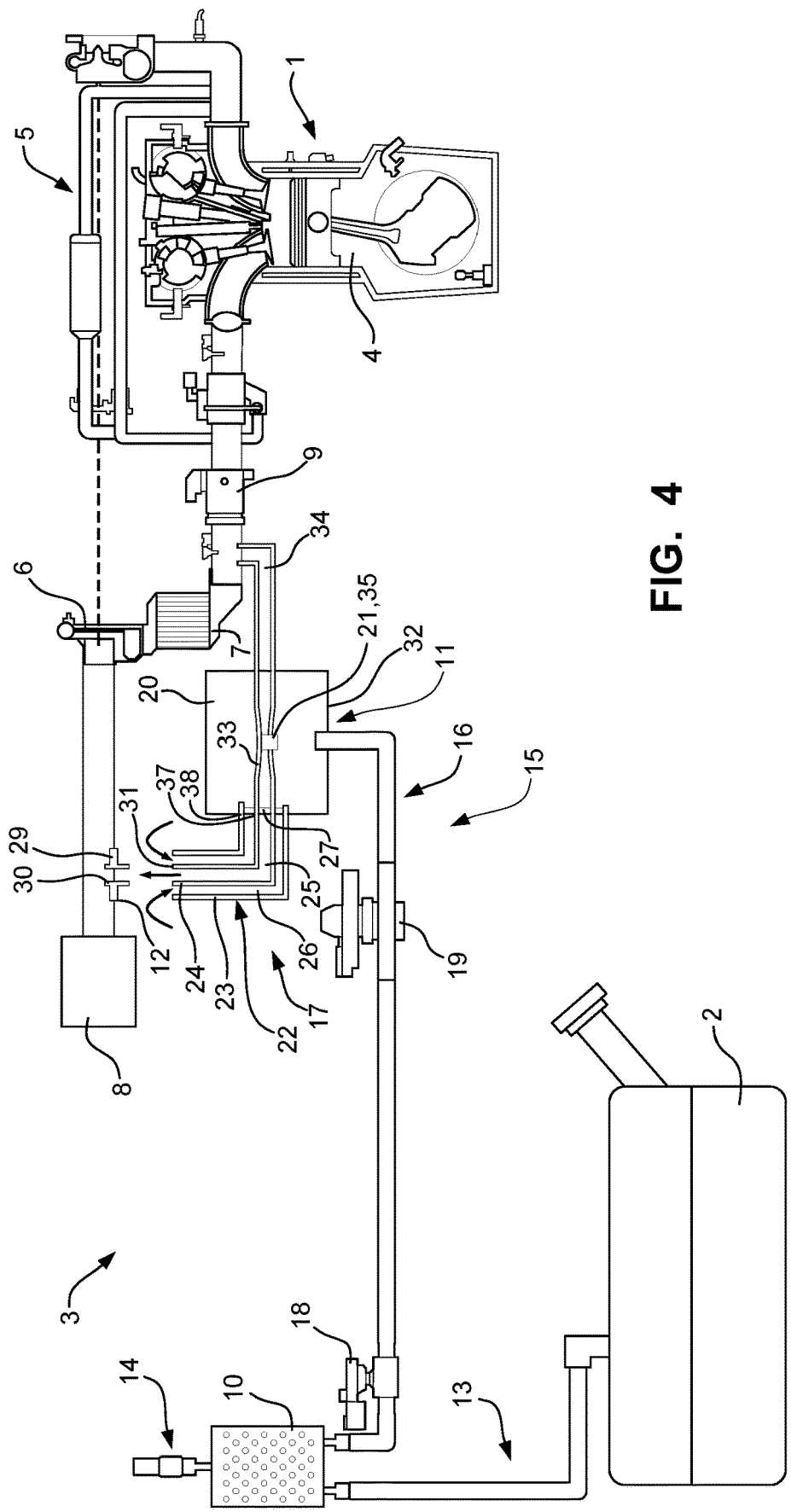
FIG. 4 depicts the assembly of FIG. 3 when a fuel vapor leak arises.

FIGS. 3 and 4 illustrate a second embodiment of the invention, in which the pump of the purge circuit is a venturi-effect pump. Elements in the two embodiments that are common or similar are numbered with the same numerals referring to the figures.

In this second embodiment, the pump 11 is formed of a fluidtight enclosure 32 in which a venturi tube 33 is housed. This venturi tube 33 is connected on the one hand to the intake side of the engine downstream of the turbocharger 6 by a connecting duct 34 and on the other hand is connected to the intake side of the engine 1 upstream of the turbocharger 6 by the internal conduit 25 of the double pipe 22.

The fluidtight enclosure 32 delimits the intake chamber 20 of the pump 11. A diffusion orifice 35, made in the venturi tube 33, constitutes the intake of the pump 11.

The external conduit 26 extends between the fluidic connection 12 via which its end is plugged, and the intake chamber 20 into which the external conduit 26 opens. The upstream duct 16 also opens into the intake chamber 20.

The nominal operation of the control device 3 is illustrated with reference to FIG. 3. When the turbocharger 6 is activated and the control device 3 is performing a purge of the absorbent filter 10, fluid is made to circulate in the venturi tube 33 as a result of the pressure differential between the upstream and downstream sides of the turbocharger 6. As this circulation of fluid creates a depression in the venturi tube 33, the fluid contained in the intake chamber 20 is therefore drawn up via the diffusion orifice 35. As the purge valve 19 is open, the depression created in the intake chamber 20 causes fuel vapors to be drawn in from the upstream duct 16.

The fuel vapors are thus drawn into the intake chamber 20 and then into the intake 21 consisting of the diffusion orifice 35. The fuel vapors are diffused into the flow passing along the venturi tube 33 and are thus injected into the intake side of the engine 1 via the fluidic connection 12.

FIG. 4 illustrates the situation of a leak in the downstream duct 17, such as this duct being pulled out or becoming broken. As in the first embodiment, the broken end 31 provides a connection between the external conduit 26 and the atmospheric air, the latter then filling the intake chamber 20 when the pump 11 is activated. The air is drawn in through the intake 21 consisting of the diffusion orifice 35, so that the fuel vapors present in the upstream duct 16 are no longer pumped into the intake chamber 20. The leak is thus neutralized.

Other variant embodiments of the fuel vapor emissions control device may be implemented without departing from the scope of the invention. In particular, the double pipe 22 may be constructed differently, for example using two pipes that are juxtaposed and joined together along their entire length. The two conduits 25, 26 are then arranged side-by-side rather than coaxially.

The invention claimed is:

1. A fuel vapor emissions control device intended for a vehicle with an internal combustion engine supplied from a fuel tank, the device comprising:
   an absorbent filter configured to store fuel vapors coming from the fuel tank of the vehicle;
   a purge circuit configured to purge the absorbent filter and configured to inject the fuel vapors contained in the absorbent filter into the intake side of the engine of the vehicle, the purge circuit comprising:
   a pump equipped with
     an intake configured to draw in the fuel vapors coming from the absorbent filter, and
     a delivery outlet configured to deliver the fuel vapors to the engine,
   an upstream duct connecting the absorbent filter to the pump, and
   a downstream duct connecting the pump to a fluidic connection for connection to the engine,
   wherein the pump comprises an intake chamber into which the intake of the pump opens,
   the upstream duct is connected by one end to the absorbent filter and via another end of the upstream duct opening into the intake chamber of the pump,
   the downstream duct comprises a double tubular wall defining two separate conduits including
     a first conduit connecting the delivery outlet of the pump to the fluidic connection for connection to the engine, and
     a second conduit which is connected by one end to the fluidic connection for connection to the engine and which at another end of the second conduit opens into the intake chamber of the pump,
   the pump is a motorized pump,
   the intake chamber comprises an enclosure surrounding the intake of the pump, and
   the second conduit is connected to the intake chamber by an internal duct in the body of the pump.

2. The device as claimed in claim 1, wherein the fluidic connection forms a stopper for the second conduit.

3. The device as claimed in claim 2, wherein the fluidic connection for connection to the engine comprises a coupling connected to the first conduit and configured to inject fuel vapors into the intake side of the engine, and a stop surface adjacent to the coupling and configured to stopper the second conduit.

4. The device as claimed in claim 1, wherein the downstream duct comprises two coaxial tubular walls, the first conduit and the second conduit thus being coaxial.

5. The device as claimed in claim 4, wherein the first conduit is an internal conduit and the second conduit is an external conduit surrounding the first conduit.

6. The device as claimed in claim 1, further comprising a purge valve arranged on the purge circuit.

7. The device as claimed in claim 6, wherein the purge valve is arranged on the downstream duct of the purge circuit providing fluidic continuity with the second conduit.

8. The device as claimed in claim 1, further comprising a leak detector.

9. The device as claimed in claim 1, wherein the downstream duct is connected to the pump by a connection comprising a first coupling connecting the first conduit to the delivery outlet of the pump, and a second coupling connecting the second conduit to the internal duct of the body of the pump.

10. The device as claimed in claim 1, wherein the pump is a venturi-effect pump, the intake of the pump consisting of a diffusion orifice made in a venturi tube.

11. The device as claimed in claim 10, wherein the intake chamber consists of an enclosure surrounding the venturi tube.

12. The device as claimed in claim 2, wherein the downstream duct comprises two coaxial tubular walls, the first conduit and the second conduit thus being coaxial.

13. The device as claimed in claim 3, wherein the downstream duct comprises two coaxial tubular walls, the first conduit and the second conduit thus being coaxial.

14. The device as claimed in claim 2, further comprising a purge valve arranged on the purge circuit.

15. The device as claimed in claim 3, further comprising a purge valve arranged on the purge circuit.

16. The device as claimed in claim 4, further comprising a purge valve arranged on the purge circuit.

17. The device as claimed in claim 5, further comprising a purge valve arranged on the purge circuit.

18. The device as claimed in claim 2, further comprising a leak detector.

19. The device as claimed in claim 3, further comprising a leak detector.

20. The device as claimed in claim 4, further comprising a leak detector.

\* \* \* \* \*